US012579089B2

(12) United States Patent
Liang

(10) Patent No.: US 12,579,089 B2
(45) Date of Patent: Mar. 17, 2026

(54) DATA PROCESSING METHOD, APPARATUS AND SYSTEM BASED ON PARA-VIRTUALIZATION DEVICE

(71) Applicant: HANGZHOU ALICLOUD FEITIAN INFORMATION TECHNOLOGY CO., LTD., Hangzhou City (CN)

(72) Inventor: Chen Liang, Beijing (CN)

(73) Assignee: HANGZHOU ALICLOUD FEITIAN INFORMATION TECHNOLOGY CO., LTD., Hangzhou City (CN)

( * ) Notice: Subject to any disclaimer, the term of this patent is extended or adjusted under 35 U.S.C. 154(b) by 110 days.

(21) Appl. No.: 18/685,110

(22) PCT Filed: Feb. 3, 2023

(86) PCT No.: PCT/CN2023/074420
§ 371 (c)(1),
(2) Date: Feb. 20, 2024

(87) PCT Pub. No.: WO2023/155698
PCT Pub. Date: Aug. 24, 2023

(65) Prior Publication Data
US 2025/0130963 A1 Apr. 24, 2025

(30) Foreign Application Priority Data
Feb. 18, 2022 (CN) .......................... 202210153414.2

(51) Int. Cl.
G06F 13/28 (2006.01)
G06F 9/455 (2018.01)
G06F 13/40 (2006.01)

(52) U.S. Cl.
CPC .......... *G06F 13/28* (2013.01); *G06F 9/45558* (2013.01); *G06F 2009/45583* (2013.01)

(58) Field of Classification Search
CPC ................. G06F 13/28; G06F 9/45558; G06F 2009/45583
(Continued)

(56) References Cited

U.S. PATENT DOCUMENTS

| 10,657,084 | B1 * | 5/2020 | Thyamagondlu | ....... G06F 13/24 |
| 2005/0086390 | A1 * | 4/2005 | Banerjee | ............... H04L 69/161 |
| | | | | 709/250 |

(Continued)

FOREIGN PATENT DOCUMENTS

| CN | 104395895 A | 3/2015 |
| CN | 104615495 A | 5/2015 |

(Continued)

OTHER PUBLICATIONS

Office Action issued on Oct. 30, 2024 in counterpart Chinese Application No. 202210153414.2 entitled "Apparatus and System for Data Processing Based On Para-Virtualiation Device" (6 pages).

(Continued)

*Primary Examiner* — Chun Kuan Lee
(74) *Attorney, Agent, or Firm* — Clark Hill PLC

(57) ABSTRACT

A data processing method, apparatus and system based on a para-virtualization device are provided. The method comprises: acquiring a plurality of pieces of initial data which are stored in a completion queue of a para-virtualization device, wherein the plurality of pieces of initial data are used for representing description information of original data which has been processed by the para-virtualization device, but has not been submitted to a host; determining a plurality of pieces of first data, which meet a preset condition, among the plurality of pieces of initial data; performing an aggregation operation on the plurality of pieces of first data, so as to generate a first aggregation result; and sending to a (Continued)

memory of the host a direct memory access request that carries the first aggregation result.

20 Claims, 5 Drawing Sheets

(58) Field of Classification Search
USPC .......................................................... 710/22
See application file for complete search history.

(56) References Cited

U.S. PATENT DOCUMENTS

| | | | |
|---|---|---|---|
| 2008/0147905 A1* | 6/2008 | Shi ........................... | G06F 13/32 |
| | | | 710/22 |
| 2012/0260005 A1* | 10/2012 | Couvee ................... | G06F 13/28 |
| | | | 710/22 |
| 2016/0124876 A1* | 5/2016 | Vucinic ................. | G06F 3/0656 |
| | | | 710/308 |
| 2018/0088978 A1 | 3/2018 | Li et al. | |
| 2020/0174819 A1 | 6/2020 | Dong et al. | |
| 2021/0271426 A1 | 9/2021 | Cao et al. | |

FOREIGN PATENT DOCUMENTS

| | | |
|---|---|---|
| CN | 103176833 B | 12/2016 |
| CN | 111133416 A | 5/2020 |
| CN | 114637574 A | 6/2022 |
| WO | 2014004060 A1 | 1/2014 |

OTHER PUBLICATIONS

English-language translation of Office Action issued on Oct. 30, 2024 in counterpart Chinese Application No. 202210153414.2 entitled "Apparatus and System for Data Processing Based on Para-Virtualiation Device" (6 pages).
English-language abstract of CN 104615495 A.
Extended European Search Report of European Patent Application No. 23755701.2 based on PCT/CN2023/074420, dated Jun. 30, 2025 (9 pages).
International Search Report for PCT/CN2023/074420 entitled "Data Processing Method, Apparatus and System Based On Para-Virtualization Device", dated Jul. 4, 2023 (6 pages including English-language translation).
Written Opinion for PCT/CN2023/074420 entitled "Data Processing Method, Apparatus and System Based On Para-Virtualization Device", dated Jul. 4, 2023 (4 pages).

* cited by examiner

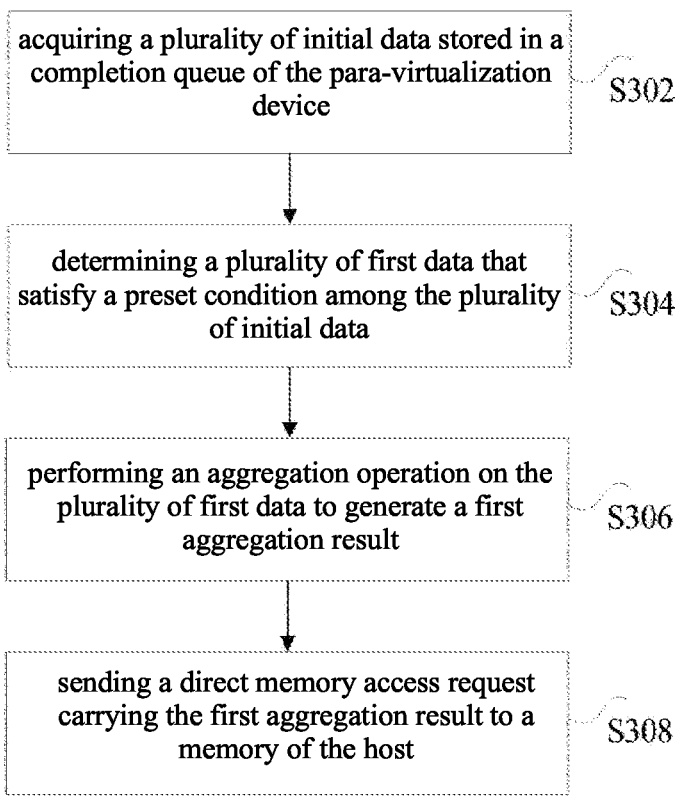

acquiring a plurality of initial data stored in a completion queue of the para-virtualization device          S302 determining a plurality of first data that satisfy a preset condition among the plurality of initial data          S304 performing an aggregation operation on the plurality of first data to generate a first aggregation result          S306 sending a direct memory access request carrying the first aggregation result to a memory of the host          S308

FIG. 3

DATA PROCESSING METHOD, APPARATUS AND SYSTEM BASED ON PARA-VIRTUALIZATION DEVICE

This is an application under 35 U.S.C. § 371 of International Application No. PCT/CN2023/074420 filed Feb. 3, 2023, entitled "DATA PROCESSING METHOD, APPARATUS AND SYSTEM BASED ON PARA-VIRTUALIZATION DEVICE", which claims priority to Chinese patent application No. 202210153414.2, filed with the Chinese Patent Office on Feb. 18, 2022, and entitled "Data Processing Method, Apparatus and System Based on Para-virtualization device", which is incorporated herein by reference in its entirety.

TECHNICAL FIELD

The present application relates to a field of virtualization technology, and in particular, to a data processing method, apparatus and system based on a para-virtualization device.

BACKGROUND

At present, during implementation of virtualization of a virtio device with software and hardware combined, a host is connected with a device through PCIe (Peripheral Component Interconnect express, that is, a high-speed serial computer extension bus standard). According to the specifications of the virtio device, after receiving data, the device shall submit the same to a CPU (Central Processing Unit) through a plurality of steps. Data are written into a host memory by means of a DMA (Direct Memory Access) in each step. However, when each step is performed too frequently, a functional bottleneck will occur at the PCIe subsystem of the CPU, and back-pressurization of the PCIe interface will be seen on the device side, resulting in degraded DMA performance.

No effective solutions have yet been proposed to address the problems mentioned above.

SUMMARY

According to an aspect of the embodiments of the present application, it is provided a data processing method based on a para-virtualization device, including: acquiring a plurality of initial data stored in a completion queue of the para-virtualization device, wherein the plurality of initial data is used to characterize descriptive information of raw data which has been processed by the para-virtualization device but not been submitted to a host; determining a plurality of first data that satisfy a preset condition among the plurality of initial data; performing an aggregation operation on the plurality of first data to generate a first aggregation result; sending a direct memory access request carrying the first aggregation result to a memory of the host.

According to another aspect of the embodiments of the present application, it is further provided a data processing apparatus based on a para-virtualization device, including: a data acquisition module for acquiring a plurality of initial data stored in a completion queue of the para-virtualization device, wherein the plurality of initial data is used to characterize descriptive information of raw data which has been processed by the para-virtualization device but not been submitted to a host; a data determination module for determining a plurality of first data that satisfy a preset condition among the plurality of initial data; an aggregation module for performing an aggregation operation on the plurality of first data to generate a first aggregation result; a sending module for sending a direct memory access request carrying the first aggregation result to a memory of the host.

According to another aspect of the embodiments of the present application, it is further provided a data processing system based on a para-virtualization device, including a host, including a memory and a completion queue; the para-virtualization device connected with the host for acquiring a plurality of initial data stored in the completion queue, wherein the plurality of initial data is used to characterize descriptive information of raw data which has been processed by the para-virtualization device but not been submitted to the host; determining a plurality of first data that satisfy a preset condition among the plurality of initial data; performing an aggregation operation on the plurality of first data to generate a first aggregation result; sending a direct memory access request carrying the first aggregation result to a memory of the host.

According to another aspect of the embodiments of the present application, it is further provided a computer-readable storage medium including a stored program, wherein the program, when running, controls a device in which the computer-readable storage medium is located to execute the data processing method based on the para-virtualization device described above.

According to another aspect of the embodiments of the present application, it is further provided a computer terminal, including: a memory and a processor, the processor being used to run a program stored in the memory, wherein the program, when running, executes the data processing method based on the para-virtualization device described above.

BRIEF DESCRIPTION OF THE DRAWINGS

The accompanying drawings illustrated here are provided for further understanding of the present application, constituting a part of the present application. The schematic embodiments of the present application and descriptions thereof are used to illustrate the present application, not constituting an improper limitation on the present application. In the accompanying drawings:

FIG. 3 is a flow diagram of a data processing method based on a para-virtualization device according to an embodiment of the present application;

DETAILED DESCRIPTION

In order to enable those skilled in the art to better understand the solution of the present application, the technical solution in the embodiments of the present invention will be described clearly and completely below in conjunction with the accompanying drawings in the embodiments of the present invention. It is obvious that the described embodiments are some of the embodiments of the present application, rather than all of them. Based on the embodiments of the present application, all other embodiments obtained by those skilled in the art without involving any creative efforts should fall within the scope of protection of the present invention.

Embodiments of the present application provide a data processing method, apparatus and system based on a para-virtualization device to at least solve the technical problem in the related technologies, that is, in past, the para-virtualization device is frequently interacted with the host, resulting in degraded DMA performance.

It should be noted that terms such as "first", "second", etc. in the description and claims of the present application as well as in the accompanying drawings above are used to distinguish similar objects, instead of describing a specific order or sequence. It should be understood that data used in this way may be exchanged under appropriate circumstances, so that the embodiments of the present application described herein may be implemented in an order other than those illustrated or described herein. In addition, terms such as "including" and "having" as well as any variants thereof are intended to cover the nonexclusive inclusion. For example, processes, methods, systems, products, or devices containing a series of steps or units do not need to be limited to those steps or units clearly listed, but may include other steps or units, which are not clearly listed or are inherent to those processes, methods, products, or devices.

First, some nouns or terms mentioned in describing the embodiments of the present application are applicable to the following explanations.

'Virtio': virtio is an I/O para-virtualization solution, a set of general-purpose I/O device virtualization programs, an abstraction of a set of general-purpose I/O devices in a para-virtualized Hypervisor. A device using the virtio protocol is called as a virtio device.

'Data Buffer': it stores data received by a device.

'Used Ring': it is a completion queue of a virtio device. After a device completes a request issued by a driver, the hardware notifies, by submitting a 'Used Ring', the driver that a command has been completed. The 'Used Ring' points to the structural body of a data buffer, only including description information of data (address, length, and the like).

'Used Ring Index': a pointer of a 'Used Ring'.

Figure 1:
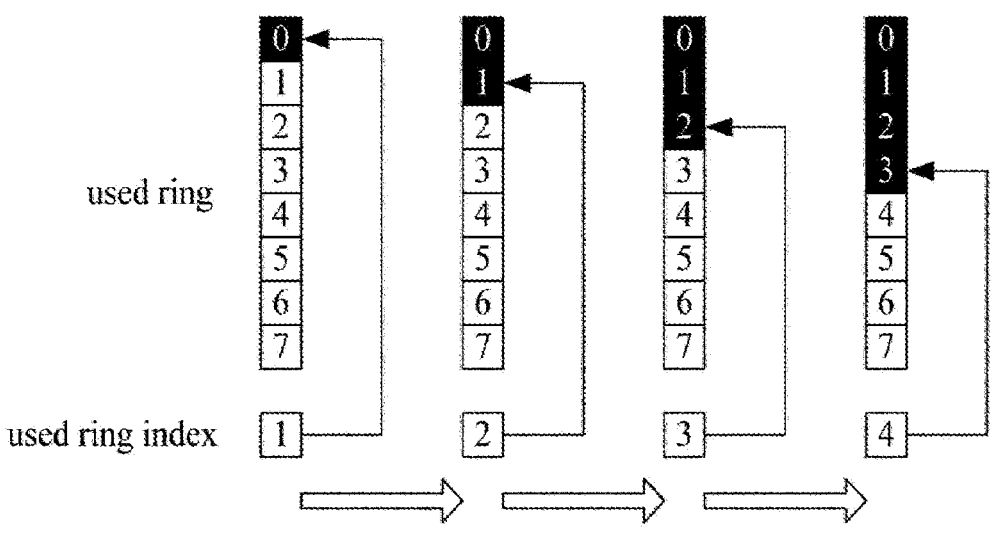
FIG. 1 is a schematic diagram of updating 'Used Rings' in the existing technology.

At present, after a current device receives data, it needs to go through the following three steps to submit it to a CPU: writing a data buffer; writing a 'Used Ring'; and writing a 'Used Ring Index'. For example, take the submission of 'Used Rings' as an example for illustration. As shown in FIG. 1, a 'Used Ring' includes 8 queue items with the one/those submitted shown by a solid box/solid boxes, while those not submitted shown by a hollow box/hollow boxes. Existing steps of writing a 'Used Ring' are as follows: submitting queue item 0 to the CPU, and updating the 'Used Ring' index to 1, which indicates that it has not been submitted from queue 1; submitting queue 1 to CPU, and updating the 'Used Ring' index to 2, which indicates that it has not been submitted from queue 2; submitting queue 2 to the CPU, and updating the 'Used Ring' index to 3, which indicates that it has not been submitted from queue 3; submitting queue 3 to the CPU, and updating the 'Used Ring' index to 4, which indicates that it has not been submitted from queue 4.

As such, when it is necessary to update a plurality of queue items in the 'Used Ring', or it is necessary to update the 'Used Ring Index' for many times, DMA requests shall be initiated multiple times, resulting in a large number of operations and a degradation of DMA performance.

In order to solve the above problem, the present application provides an aggregated submission solution which decreases the number of updates and improves the DMA performance by aggregating multiple DMA requests that need to be initiated into a single one.

In embodiments of the present application, when it is necessary to update a 'Used Ring', a plurality of initial data stored in the 'used' may be obtained. Afterwards, a plurality of first data that satisfy a preset condition are screened from the plurality of initial data, an aggregation operation is performed on the plurality of first data to generate a first aggregation result, and a DMA request that carries the first aggregation result is sent to the memory, thereby achieving the purpose of updating a plurality of queue items in the 'Used Ring' once. It is readily observed that by initiating a DMA request by means of an aggregation operation, there is no need to initiate a DMA request for each queue item, thereby achieving the technical effects of reducing the number of operations generated by updating the 'Used Ring', avoiding the occurrence of a back-pressurization of the PCIe interface on the device side, and improving the DMA performance, thereby solving the technical problem in the related technologies of frequent interactions between the para-virtualization device and the host that results in a reduced DMA performance.

EMBODIMENT 1

According to an embodiment of the present application, it is further provided a data processing method based on a para-virtualization device. It should be noted that steps shown in the flow diagrams of the accompanying drawings may be executed in a computer system such as a set of computer executable instructions. Moreover, although logical orders are shown in the flow diagrams, the steps shown or described may be executed in a different order under some circumstances.

Figure 2:
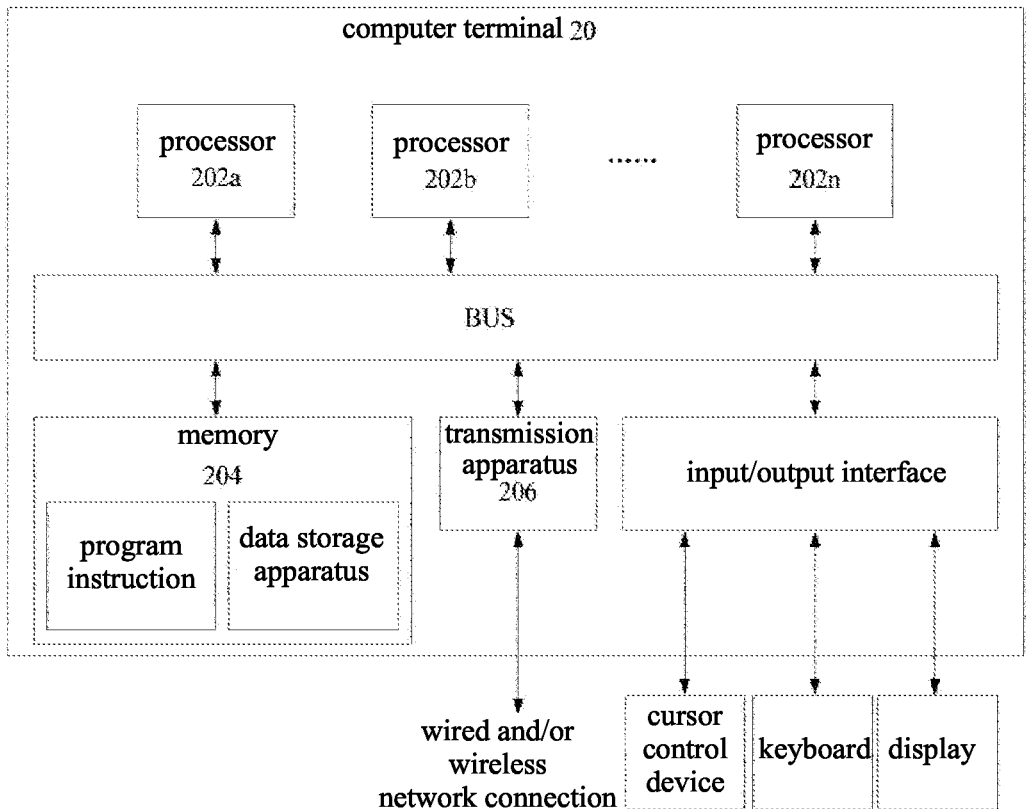
FIG. 2 is a structural block diagram of hardware of a computer terminal (or a mobile device) for implementing a data processing method based on a para-virtualization device according to an embodiment of the present application.

The method embodiments provided in embodiments of the present application may be executed in a mobile terminal, a computer terminal or a similar operating apparatus. FIG. 2 shows a structural block diagram of hardware of a computer terminal (or a mobile device) for implementing a data processing method based on a para-virtualization device. As shown in FIG. 2, a computer terminal 20 (or a mobile device) may include one or more (shown by 202*a*, 202*b*, . . . 202*n* in the Figure) processors (which may include but not limited to processing apparatuses such as microprocessor (MCU) or Field Programmable Gate Array (FPGA)), a memory 204 for storing data, and a transmission apparatus 206 for communication functions. Additionally, it may further include: a display, an input/output interface (I/O interface), a Universal Serial Bus (USB) port (which may be included as one of the ports of the BUS), a network interface, a power source and/or a camera. It should be understood by those skilled in the art that the structure as shown in FIG. 2 is illustrative only, rather than limiting the structure of the electronic apparatus described above. For example, the computer terminal 20 may further include more or fewer subassemblies than that shown in FIG. 2 or have a different configuration from that shown in FIG. 1.

It should be noted that the one or more processors 202 described above and/or other data processing circuits may be generally referred to as "a data processing circuit" herein. The data processing circuit may be embodied in whole or in part as software, hardware, firmware, or any other combination. In addition, the data processing circuit may be a single independent processing module, or may be fully or partially combined into any one of the other components in the computer terminal 20 (or a mobile device). The data processing circuit serves as a processor control (e.g., selection of a variable resistor terminal path connected with an interface).

The memory 204 may be used to store software programs and modules of application software. As for the program instructions/data storage apparatus corresponding to a data processing method based on a para-virtualization device in an embodiment of the present application, a processor executes various function applications and data processing by operating software programs and modules stored in the memory 204, so as to implement the data processing method based on the para-virtualization device described above. The memory 204 may include a high-speed random-access memory, and may also include a non-volatile memory, such as one or more magnetic storage apparatuses, a flash memory, or other non-volatile solid-state memories. In some examples, the memory 204 may further include a memory arranged with respect to processors 202 remotely. The remote memory may be connected to the computer terminal 20 via a network. The examples of the network described above include but not limited to internet, intranet, local area network, mobile communication network, and combinations thereof.

The transmission apparatus 206 is used to receive or send data via a network. The specific examples of the network mentioned above may include a wireless network provided by a communication provider of the computer terminal 20. In an example, the transmission apparatus 206 includes a network adapter (Network Interface Controller (NIC)), which may be connected with other network devices through a base station, and thus may be communicated with the internet. In an example, the transmission apparatus 206 may be a Radio Frequency (RF) module for communication with the internet wirelessly.

The display may be a touch-screen Liquid Crystal Display (LCD) for example. The Liquid Crystal Display may enable a user to interact with a user interface of the computer terminal 20 (or a mobile device).

It should be noted here that in some optional embodiments, the computer device (or a mobile device) shown in FIG. 2 above may include a hardware element (including a circuit), a software element (including computer codes stored in the computer readable media), or a combination of a hardware and software elements. It should be pointed out that FIG. 2 is only an example of specific embodiments, and aims to show the types of components that may exist in a computer device (or a mobile device) described above.

In the operating environment mentioned above, the present application provides a data processing method based on a para-virtualization device shown in FIG. 3. FIG. 3 is a flow diagram of a data processing method based on a para-virtualization device according to an embodiment of the present application. As shown in FIG. 3, the method includes the following steps:

Step S302: acquiring a plurality of initial data stored in a completion queue of the para-virtualization device, wherein the plurality of initial data is used to characterize descriptive information of raw data which has been processed by the para-virtualization device but not been submitted to a host.

The para-virtualization device in the step mentioned above may be mounted on a host, for example, which may be a para-virtualization network card, and may also be a para-virtualization memory, to which no limitation is made. The initial data in the step mentioned above may be a data item(s) stored in a 'Used Ring' but not submitted to the CPU, with each data item stored with description information of corresponding raw data. The description information may include an address of a data buffer stored with raw data, the length of the raw data, and so forth, but no limitation is made thereto. With regard to different types of para-virtualization devices, the types of raw data are different. For example, for a para-virtualization network card, the raw data may be original messages.

Figure 4:
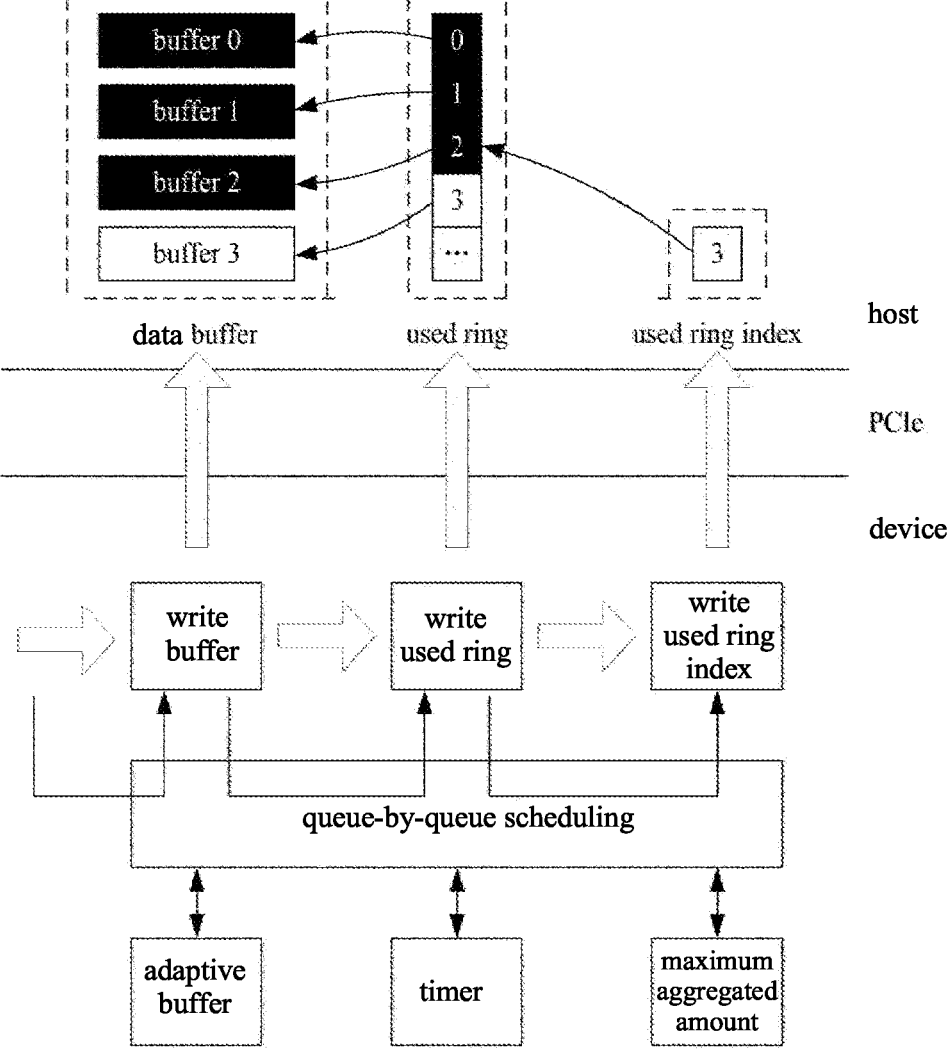
FIG. 4 is a schematic diagram of an optional architecture of implementing virtualization of a virtio device with software and hardware combined according to an embodiment of the present application.

For example, taking the architecture of implementing virtualization of a virtio device with software and hardware combined shown in FIG. 4 as an example for illustration, after receiving raw data, a device first executes a step of writing a buffer to write the raw data in different buffers, and wait for the host to process the raw data. After processing by the virtio device is completed, i.e., the raw data are written in different buffers, the corresponding description information may be stored in the 'Used Ring'. For example, raw data stored in buffer 0 to buffer 2 are written in corresponding buffers, and the corresponding description information may be stored in the 'Used Ring', which corresponds to queue item 0 to queue item 2. Afterwards, the step of writing the 'Used Ring' is executed, and the corresponding description information in queue 0 to queue 2 may be used as initial data.

Step S304: determining a plurality of first data that satisfy a preset condition among the plurality of initial data.

The preset condition in the step mentioned above may be an aggregation condition set in advance in light of actual needs. For example, the condition may be all queue items not submitted in the 'Used Ring'. The condition may also be queue items not submitted corresponding to the same network card transmission queue, to which no limitation is made.

For example, still taking the architecture of implementing virtualization of a virtio device with software and hardware combined in FIG. 4 as an example for illustration, assuming that the preset condition is all queue items not submitted in the 'Used Ring', queue item 0 to queue item 2 may be then used as first data.

Step S306: performing an aggregation operation on the plurality of first data to generate a first aggregation result.

In an optional example, the aggregation operation mentioned above may be to splice description information corresponding to the plurality of first data. For example, addresses are spliced and lengths are summed to obtain the above-described first aggregation result, but no limitation is made thereto. Other aggregation operations may also be used.

Step S308: sending a direct memory access request carrying the first aggregation result to a memory of the host.

In an optional embodiment, for the first aggregation result, in order to be able to update the memory corresponding to a 'Used Ring' at one time, the first aggregation result may be encapsulated according to the DMA protocol to obtain a DMA request, and the DMA request may be sent to the memory of the host, thereby accomplishing the purpose of updating the 'Used Ring'.

Figure 5:
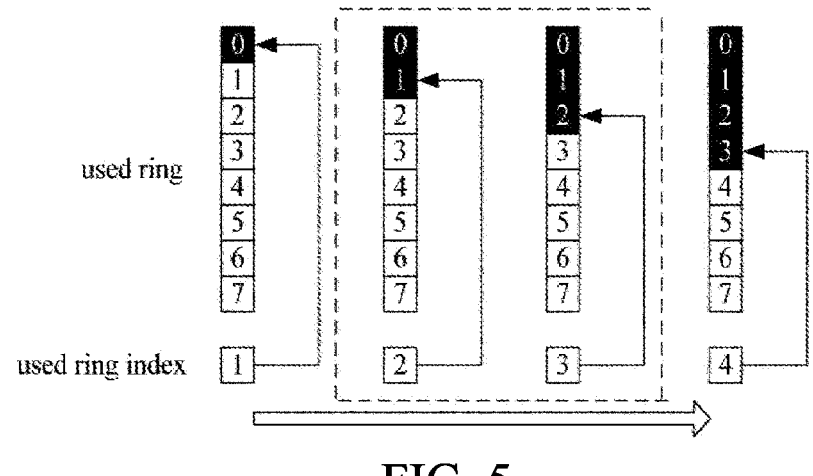
FIG. 5 is a schematic diagram of optional update of 'Used Rings' according to an embodiment of the present application.

For example, the 'Used Ring' shown in FIG. 5 is taken as an example for illustration. None of the 8 queue items contained in the 'Used Ring' is submitted to the memory. At this time, the queue item 0 has been submitted. Queue item 1 to queue item 7 may be used as initial data. Queue item 1 to queue item 3 may be screened as first data through a preset condition, and the three queue items can be aggregated to generate a DMA request, thereby completing update of queue items 1 to 3 of the 'Used Ring' at once. Further, the boxes corresponding to queue items 1 to 3 are changed to solid boxes, indicating that queue items 1 to 3 have been submitted.

According to the solution provided in the embodiment of the present application described above, when it is necessary to update a 'Used Ring', a plurality of initial data stored in the 'Used Ring' may be obtained. Afterwards, a plurality of first data that satisfy a preset condition are screened from the plurality of initial data, an aggregation operation is performed on the plurality of first data to generate a first aggregation result, and a DMA request that carries the first aggregation result is sent to the memory, thereby achieving the purpose of updating a plurality of queue items in the 'Used Ring' at once. It is readily observed that by initiating a DMA request by means of an aggregation operation, there is no need to initiate a DMA request for each queue item, thereby achieving the technical effects of reducing the number of operations generated by updating the 'Used Ring', avoiding the occurrence of a back-pressurization of the PCIe interface on the device side, and improving the DMA performance, thereby solving the technical problem in the related technologies of frequent interactions between the para-virtualization device and the host that results in a reduced DMA performance.

In the embodiment of the present application described above, determining the plurality of first data that satisfy the preset condition among the plurality of initial data includes at least one of the following: acquiring data stored in a target buffer to obtain the plurality of first data, wherein the plurality of initial data are sequentially cached to the target buffer; determining the plurality of initial data as the plurality of first data in a case where a preset time arrives; determining the plurality of initial data as the plurality of first data in a case where the amount of the plurality of initial data is greater than or equal to a preset amount.

The target buffer mentioned above may be a preset adaptive buffer. When PCIe performance is bottlenecked, data accumulates in the adaptive buffer. In an optional embodiment, before being submitted to the CPU, queue items in a 'Used Ring' will be stored in the adaptive buffer in sequence. As such, all data items stored in the adaptive cache may be used as first data.

The preset time mentioned above may be time preset by a timer, and may be set in light of actual needs. In an optional embodiment, before the preset time arrives, it is not necessary to process queue stored in a 'Used Ring' in any manner. After the preset time arrives, all unsubmitted queue items stored in the 'Used Ring' may be used as first data.

The preset amount mentioned above may be a preset maximum aggregated amount, and may be preset in light of actual needs. In an optional embodiment, before the amount of unsubmitted queue items stored in a 'Used Ring' does not reach the preset amount, it is not necessary to process the queue items stored in the 'Used Ring' in any manner. After the amount of unsubmitted queue items reaches the preset amount, all unsubmitted queue items stored in the 'Used Ring' may be used as first data.

It should be noted that the three conditions mentioned above may be used separately or in any combination, for example, combining the target buffer with the pre-set time, combining the target buffer with the preset amount, combining the preset time with the preset amount, and combining the target buffer, the pre-set time, and the preset amount. The specific combination modes may be determined in light of actual needs, no specific limitation is made thereto in the present application.

For example, the architecture of implementing virtualization of a virtio device with software and hardware combined in FIG. 4 is still taken as an example for illustration. The preset condition may include adaptive caching, a timer, and a maximum aggregated amount. The three methods mentioned above may be used in combination to determine first data and to perform an aggregation operation on the first data.

In the above embodiment of the present application, performing the aggregation operation on the plurality of first data to generate the first aggregation result includes: determining a first transmission queue corresponding to each first data, wherein the first transmission queue is used to transmit the raw data; acquiring first data corresponding to a same first transmission queue to obtain the first aggregation result.

Since the virtio device supports a plurality of queues, the first transmission queue mentioned above may be a queue supported by the virtio device. The virtio device may transmit raw data to the host by using a plurality of queues, each of which corresponds to a 'Used Ring'.

In an optional embodiment, with regard to each queue item, a queue to which corresponding raw data is sent may be determined. Prior to an aggregation operation, queue items corresponding to different queues are often intertwined, it is not possible to carry out an aggregation operation. As such, queue items corresponding to the same queue may be arranged together by means of queue-by-queue scheduling, and then the queue items corresponding to the same queue may be aggregated to obtain a first aggregation result.

Figure 6:
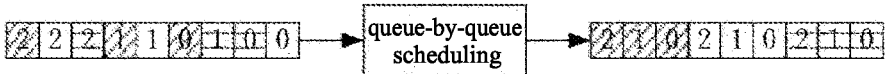
FIG. 6 is a schematic diagram of optional scheduling according to queues according to an embodiment of the present application.

For example, the architecture of implementing virtualization of a virtio device with software and hardware combined in FIG. 4 is still taken as an example for illustration. As shown in FIG. 6, boxes filled with different patterns represent queue items corresponding to different queues, and different numbers represent serial numbers in the queues. Prior to scheduling, queue items corresponding to different queues are intertwined. After scheduling, queue items corresponding to the same queue are adjacent. Hence, the queue items corresponding to the same queue may be aggregated, and submitted to a memory at one time.

In the above-mentioned embodiment of the present application, acquiring the first data corresponding to the same first transmission queue to obtain the first aggregation result includes: determining a first transmission queue corresponding to a first one of the first data among the plurality of first data to obtain a target transmission queue; acquiring first data corresponding to the target transmission queue among the plurality of first data to obtain the first aggregation result.

In an optional embodiment, due to the fact that queue items stored earlier in a 'Used Ring' indicates earlier processing time by the para-virtualization device, in order to reduce the waiting time of a device sending the raw data, the queue corresponding to the queue item with the foremost storage position in the first data can be taken as a target queue, and an aggregation operation may be performed on all first data corresponding to the target queue to obtain a first aggregation result, while first data corresponding to other queues need to wait for the completion of the submission of the first data corresponding to the target queue, before being processed.

In the embodiment of the present application described above, the method further includes: determining a plurality of second data among the plurality of initial data on the basis of an initial queue identification corresponding to the completion queue, wherein the initial queue identification is used to characterize identification information of data that has been submitted, and the plurality of second data are used to characterize data currently submitted to the host; performing an aggregation operation on the plurality of second data to obtain a second aggregation result; updating the initial queue identification on the basis of the second aggregation result.

The initial queue identification mentioned above may point to the 'Used Ring Index', pointing to the first unsubmitted queue item in the 'Used Ring'. The above update may be to update the numerical value of the 'Used Ring Index'.

In an optional embodiment, after a 'Used Ring' is updated, it is necessary to update the 'Used Ring Index'. Since a plurality of queue items in a 'Used Ring' are updated, it is necessary to update the 'Used Ring Index' for many times. In order to avoid the high number of operations caused by updating the 'Used Ring Index' for multiple times, the latest submitted queue item can be determined as second data, and multiple DMA requests can be combined into one. That is, an aggregation operation is performed on second data to obtain a second aggregation result, and the 'Used Ring Index' is updated at one time.

For example, the architecture of implementing virtualization of a virtio device with software and hardware combined in FIG. 4 is still taken as an example for illustration. After the step of writing a 'Used Ring' is executed, the step of writing a 'Used Ring Index' may be executed to perform an aggregation operation on queue item 0 to queue item 2, update the 'Used Ring Index' on the basis of the second aggregation result, and update the value to 3.

For example, a 'Used Ring' shown in FIG. 5 is taken as an example for illustration. None of the 8 queue items contained in the 'Used Ring' is submitted to the memory. At this time, the queue item 0 has been submitted. At this time, the value of 'Used Ring Index' is 1. That is, the initial queue identification is 1. Moreover, items 1 to 3 of the 'Used Ring' are updated at one time. As such, the value of the 'Used Ring Index' can be updated directly to 4.

It should be noted that the queue structures of the completion queues of different versions of virtio devices are different. For a new version of virtio device, it is not necessary to execute the steps mentioned above if there is no need to update the 'Used Ring Index'.

In the above embodiment of the present application, performing the aggregation operation on the plurality of second data to obtain the second aggregation result includes: determining a second transmission queue corresponding to each second data; acquiring second data corresponding to a same second transmission queue to obtain the second aggregation result.

The second transmission queue mentioned above may also be a queue supported by the virtio device. The virtio device may us a plurality of queues to transmit raw data to a host, each queue corresponds to a 'Used Ring'.

In an optional embodiment, similar to an aggregation operation on a queue item in the 'Used Ring', queue items corresponding to the same queue can be arranged together by means of queue-by-queue scheduling. Hence, the queue items corresponding to the same queue may be aggregated to obtain a second aggregation result.

For example, the architecture of implementing virtualization of a virtio device with software and hardware combined in FIG. 4 is still taken as an example for illustration. As shown in FIG. 6, boxes filled with different patterns represent queue items corresponding to different queues. Prior to scheduling, queue items corresponding to different queues are intertwined. After scheduling, queue items corresponding to the same queue are adjacent. Hence, the queue items corresponding to the same queue can be aggregated, and the 'Used Ring Index' can be updated at one time.

It should be noted that the queue-by-queue scheduling manner may be carried out only once. That is, if an aggregation operation by means of queue-by-queue scheduling has been applied during the process of updating a 'Used Ring', it is then not necessary to perform an aggregation operation by means of queue-by-queue scheduling when updating the 'Used Ring Index'. If an aggregation operation by means of queue-by-queue scheduling has not been applied during the process of updating a 'Used Ring', the aggregation operation by means of queue-by-queue scheduling is then performed when updating the 'Used Ring Index'.

In the above embodiment of the present application, the method further includes: acquiring a plurality of raw data; determining a third transmission queue corresponding to each raw data; sequencing the plurality of raw data according to the third transmission queue to obtain sequenced data, wherein raw data corresponding to a same third transmission queue are adjacent; sequentially writing the sequenced data into a data buffer of the host.

The third transmission queue mentioned above may also be a queue supported by a virtio device. The virtio device may transmit raw data to a host by using a plurality of queues.

In an optional embodiment, prior to an aggregation operation, queue items corresponding to different queues are often intertwined, it is not possible to directly carry out an aggregation operation. As such, raw data corresponding to the same queue may be arranged together by means of queue-by-queue scheduling, and then may be sequentially written into a data buffer according to the sequenced data.

For example, the architecture of implementing virtualization of a virtio device with software and hardware combined in FIG. 4 is still taken as an example for illustration. As shown in FIG. 6, boxes filled with different patterns represent queue items corresponding to different queues. Prior to scheduling, data corresponding to different queues are intertwined. After scheduling, data corresponding to the same queue are adjacent. Hence, data may be sequentially stored in a data buffer, thereby ensuring that queue items corresponding to the same queue in the queue items stored in the 'Used Ring' are adjacent.

It should be noted that the queue-by-queue scheduling manner may be carried out only once. That is, if raw data, before being written into a data buffer, is cached and scheduled by means of queue-by-queue scheduling, it is then not necessary to perform an aggregation operation by means of queue-by-queue scheduling when subsequently updating the 'Used Ring' and the 'Used Ring Index'. If raw data, before being written into a data buffer, is not cached and scheduled by means of queue-by-queue scheduling, in the event that an aggregation operation by means of queue-by-queue scheduling is performed during the process of updating the 'Used Ring', it is not necessary to perform an aggregation operation by means of queue-by-queue scheduling when updating the 'Used Ring Index'; in the event that an aggregation operation by means of queue-by-queue scheduling is not performed during the process of updating the 'Used Ring', an aggregation operation by means of queue-by-queue scheduling is then performed when updating the 'Used Ring Index'.

It should be noted that for the foregoing respective method examples, for the sake of simple description, they are expressed as a series of action combinations. However, those skilled in the art should know that the present application is not limited by the action sequences described, because according to the present application, some steps may be performed in other orders or simultaneously. Second, those skilled in the art should also know that the embodiments described in the description are preferred embodiments, and the actions and modules involved are not certainly essential to the present application.

Through the embodiments described above, those skilled in the art could clearly know that the method according to the embodiment mentioned above may be implemented by means of software in combination with an essential general-purpose hardware platform, and may also certainly be implemented through hardware. However, under many circumstances, the former is a better implementation. Based on such understanding, the technical solution in the present application essentially, or the portion of it that contributes to the existing technology, may be imbodied in a form of a computer product. The computer software product is stored in storage media (e.g., ROM/RAM, magnetic disk, and optical disk), including instructions for enabling a terminal device (it may be a mobile phone, a computer, a server, or a network device, etc.) to execute the methods of respective embodiments in the present application.

EMBODIMENT 2

Figure 7:
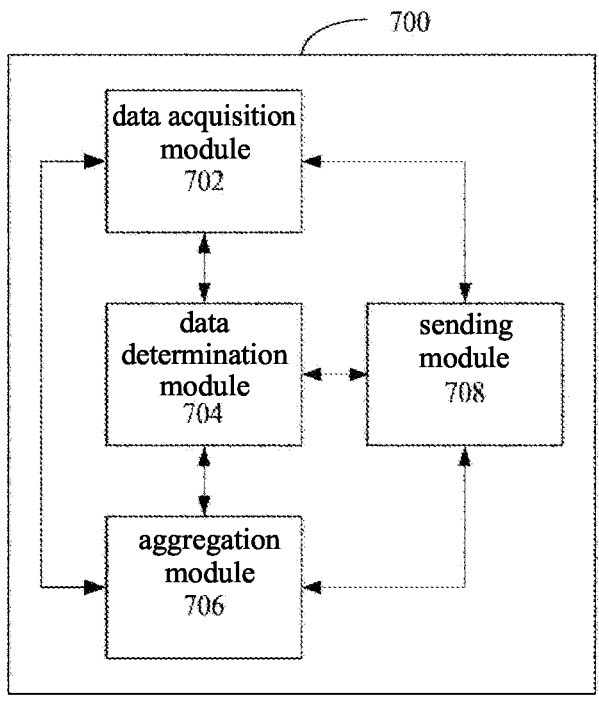
FIG. 7 is a schematic diagram of a data processing apparatus based on a para-virtualization device according to an embodiment of the present application.

According to embodiments of the present application, it is further provided a data processing apparatus based on a para-virtualization device for implementing the data processing method based on the para-virtualization device in the embodiment described above. As shown in FIG. 7, the apparatus 700 includes: a data acquisition module 702, a data determination module 704, an aggregation module 706, and a sending module 708.

The data acquisition module 702 is used for acquiring a plurality of initial data stored in a completion queue of the para-virtualization device, wherein the plurality of initial data is used to characterize descriptive information of raw data which has been processed by the para-virtualization device but not been submitted to a host. The data determination module 704 is used for determining a plurality of first data that satisfy a preset condition among the plurality of initial data. The aggregation module 706 is used for performing an aggregation operation on the plurality of first data to generate a first aggregation result. The sending module 708 is used for sending a direct memory access request carrying the first aggregation result to a memory of the host.

It should be noted here that the data acquisition module 702, the data determination module 704, the aggregation module 706, and the sending module 708 mentioned above correspond to Step S302 to Step S308 in Embodiment 1. The examples and application scenarios implemented by the four modules are the same as that implemented by the corresponding steps, but are not limited to the contents disclosed above in Embodiment 1. It should be noted that the modules above as a part of the apparatus may be operated in the computer terminal 10 provided in Embodiment 1.

In the above embodiment of the present application, the data determination module includes at least one of the following: a data acquisition unit, a first data determination unit, and a second data determination unit.

The data acquisition unit is used to acquire data stored in a target buffer to obtain a plurality of first data, where the plurality of initial data are sequentially cached to the target buffer. The first determination unit is used to determine the plurality of initial data as the plurality of first data in the event that a preset time arrives. The second determination unit is used to determine the plurality of initial data as the plurality of first data in the event that the amount of the plurality of initial data is greater than or equal to a preset amount.

In the above embodiment of the present application, the aggregation module includes: a queue determination unit and a result acquisition unit.

The queue determination unit is used to determine a first transmission queue corresponding to each first data, wherein the first transmission queue is used to transmit raw data. The result acquisition unit is used to acquire first data corresponding to the same first transmission queue to obtain a first aggregation result.

In the above embodiment of the present application, the result acquisition unit is further used to determine a first transmission queue corresponding to a first one of the first data among the plurality of first data to obtain a target transmission queue, and to acquire first data corresponding to the target transmission queue among the plurality of first data to obtain a first aggregation result.

In the above embodiment of the present application, the apparatus further includes an update module.

The data determination module is further used to determine a plurality of second data among the plurality of initial data on the basis of an initial queue identification corresponding to the completion queue, wherein the initial queue identification is used to characterize identification information of data that has been submitted, and the plurality of second data are used to characterize data currently submitted to the host. The aggregation module is further used to perform an aggregation operation on the plurality of second data to obtain a second aggregation result. The update module is used to update the initial queue identification on the basis of the second aggregation result.

In the above embodiment of the present application, the aggregation module includes: a queue determination unit and a result acquisition unit.

The queue determination unit is used to determine a second transmission queue corresponding to each second data. The result acquisition unit is used to acquire second data corresponding to the same second transmission queue to obtain a second aggregation result.

In the above embodiment of the present application, the apparatus further includes: a data acquisition module, a queue determination module, a sequencing module, and a write-in module.

The data acquisition module is used to acquire a plurality of raw data. The queue determination module is used to determine a third transmission queue corresponding to each raw data. The sequencing module is used to sequence a plurality of raw data according to the third transmission queue to obtain sequenced data, where raw data corresponding to the same third transmission queue are adjacent. The write-in module is used to sequentially write the sequenced data into a data buffer of the host.

It should be noted that the preferred solution in the above embodiment is the same as the solutions, application scenarios, and implementation processes provided in Embodiment 1, but is not only limited to the solutions provided in Embodiment 1.

EMBODIMENT 3

Figure 8:
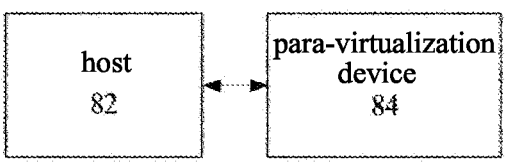
FIG. 8 is a schematic diagram of a data processing system based on a para-virtualization device according to an embodiment of the present application.

According to this embodiment of the present application, it is further provided is a data processing system based on a para-virtualization device for implementing the data processing method based on the para-virtualization device. As shown in FIG. 8, the system include:

a host 82, including a memory and a completion queue;

the para-virtualization device connected with the host for acquiring a plurality of initial data stored in the completion queue, wherein the plurality of initial data is used to characterize descriptive information of raw data which has been processed by the para-virtualization device but not been submitted to the host; determining a plurality of first data that satisfy a preset condition among the plurality of initial data; performing an aggregation operation on the plurality of first data to generate a first aggregation result; sending a direct memory access request carrying the first aggregation result to a memory of the host.

In the above embodiment of the present application, the para-virtualization device is further used to execute at least one of the following steps: acquiring data stored in a target buffer to obtain the plurality of first data, wherein the plurality of initial data are sequentially cached to the target buffer; determining the plurality of initial data as the plurality of first data in a case where a preset time arrives; determining the plurality of initial data as the plurality of first data in a case where the amount of the plurality of initial data is greater than or equal to a preset amount.

In the above embodiment of the present application, the para-virtualization device is further used for determining a first transmission queue corresponding to each first data, and acquiring first data corresponding to the same first transmission queue to obtain the first aggregation result, wherein the first transmission queue is used to transmit the raw data.

In the above embodiment of the present application, the para-virtualization device is further used for determining a first transmission queue corresponding a first one of the first data among the plurality of first data to obtain a target transmission queue, and acquiring first data corresponding to the target transmission queue among the plurality of first data to obtain the first aggregation result.

In the above embodiment of the present application, the para-virtualization device is further used for determining a plurality of second data among the plurality of initial data on the basis of an initial queue identification corresponding to the completion queue, wherein the initial queue identification is used to characterize identification information of data that has been submitted, and the plurality of second data are used to characterize data currently submitted to the hos; performing an aggregation operation on the plurality of second data to obtain a second aggregation result; updating the initial queue identification on the basis of the second aggregation result.

In the above embodiment of the present application, the para-virtualization device is further used for determining a second transmission queue corresponding to each second data; the result acquisition unit being used to acquire second data corresponding to the same second transmission queue to obtain a second aggregation result.

In the above embodiment of the present application, the host further includes a data buffer. The para-virtualization device is further used for acquiring a plurality of raw data; determining a third transmission queue corresponding to each raw data; sequencing the plurality of raw data according to the third transmission queue to obtain sequenced data, wherein raw data corresponding to a same third transmission queue are adjacent; sequentially writing the sequenced data into a data buffer of the host.

It should be noted that the preferred solutions in the above embodiment are the same as the solutions, application scenarios, and implementation processes provided in Embodiment 1 in the present application, but are not only limited to the solutions provided in Embodiment 1.

EMBODIMENT 4

The embodiments of the present application may provide a computer terminal which may be any computer terminal device in a computer terminal cluster. Optionally, in the above embodiment, the computer terminal may also be replaced by a terminal device such as mobile terminal.

Optionally, in the embodiment, the computer terminal mentioned above may be located on at least one network device among a plurality of network devices located in a computer network.

In the embodiment, the computer terminal mentioned above may execute program codes in the following steps in the data processing method based on the para-virtualization device: acquiring a plurality of initial data stored in a completion queue of the para-virtualization device, wherein the plurality of initial data is used to characterize descriptive information of raw data which has been processed by the para-virtualization device but not been submitted to a host; determining a plurality of first data that satisfy a preset condition among the plurality of initial data; performing an aggregation operation on the plurality of first data to generate a first aggregation result; sending a direct memory access request carrying the first aggregation result to a memory of the host.

Figure 9:
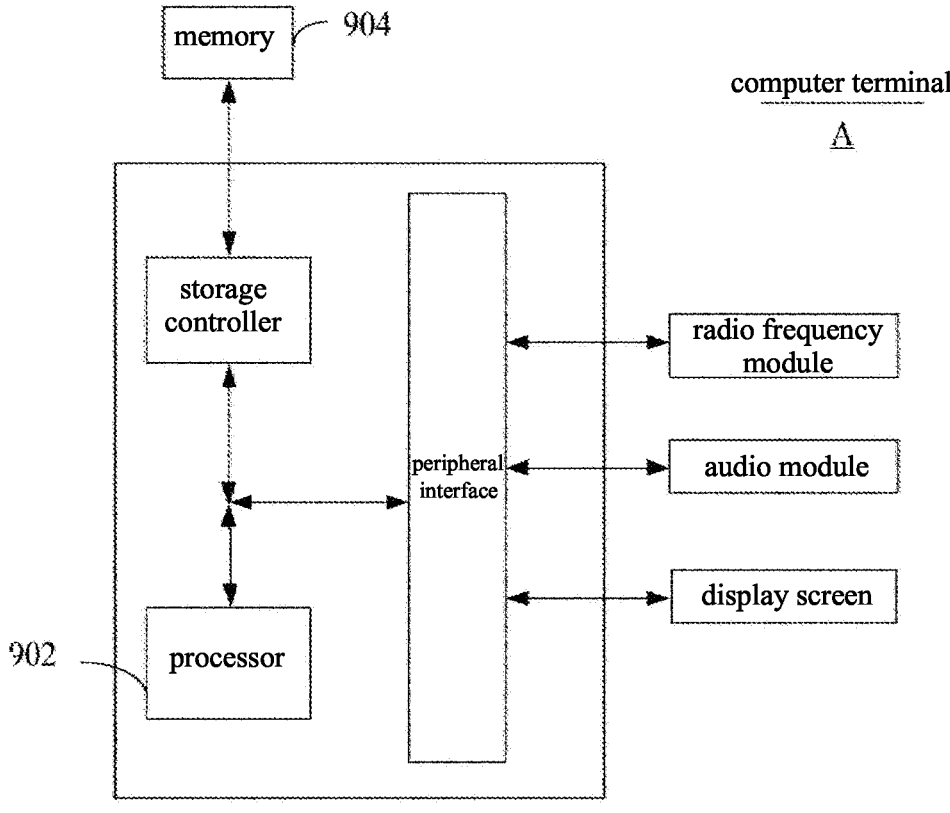
FIG. 9 is a structural block diagram of a computer terminal according to an embodiment of the present invention.

Optionally, FIG. 9 is a structural block diagram of a computer terminal according to an embodiment of the present application. As shown in FIG. 9, the computer terminal A may include: one or more (only one shown in the FIG. 9) processors 902 and a memory 904.

The memory may be used to store software programs and modules such as program instructions/modules corresponding to the data processing method and apparatus based on the para-virtualization device. The processors execute various functional applications and data processing by operating software programs and modules stored in the memory, that is, implementing the data processing method based on the para-virtualization device. The memory may include a high-speed random-access memory, and may also include a non-volatile memory such as one or more magnetic storage apparatuses, a flash memory, or other nonvolatile memories. In some examples, the memory may further include memories provided remotely relative to the processors. These remote memories may be connected to a terminal A via a network. The examples of the network above include but not limited to internet, intranet, local area network, mobile communication network and combinations thereof.

The processors may be used to invoke information and application programs stored by the memory through a transmission apparatus to execute the following steps: acquiring a plurality of initial data stored in a completion queue of the para-virtualization device, wherein the plurality of initial data is used to characterize descriptive information of raw data which has been processed by the para-virtualization device but not been submitted to a host; determining a plurality of first data that satisfy a preset condition among the plurality of initial data; performing an aggregation operation on the plurality of first data to generate a first aggregation result; sending a direct memory access request carrying the first aggregation result to a memory of the host.

Optionally, the above processors may further execute program codes in the following steps: acquiring data stored in a target buffer to obtain the plurality of first data, wherein the plurality of initial data are sequentially cached to the target buffer; and/or determining the plurality of initial data as the plurality of first data in a case where a preset time arrives; and/or determining the plurality of initial data as the plurality of first data in a case where the amount of the plurality of initial data is greater than or equal to a preset amount.

Optionally, the above processors may further execute program codes in the following steps: determining a first transmission queue corresponding to each first data, wherein the first transmission queue is used to transmit the raw data; acquiring first data corresponding to a same first transmission queue to obtain the first aggregation result.

Optionally, the above processors may further execute program codes in the following steps: determining a first transmission queue corresponding a first one of the first data among the plurality of first data to obtain a target transmission queue; acquiring first data corresponding to the target transmission queue among the plurality of first data to obtain the first aggregation result.

Optionally, the above processors may further execute program codes in the following steps: determining a plurality of second data among the plurality of initial data on the basis of an initial queue identification corresponding to the completion queue, wherein the initial queue identification is used to characterize identification information of data that has been submitted, and the plurality of second data are used to characterize data currently submitted to the host; performing an aggregation operation on the plurality of second data to obtain a second aggregation result; updating the initial queue identification on the basis of the second aggregation result.

Optionally, the above processors may further execute program codes in the following steps: determining a second transmission queue corresponding to each second data; acquiring second data corresponding to a same second transmission queue to obtain the second aggregation result.

Optionally, the above processors may further execute program codes in the following steps: acquiring a plurality of raw data; determining a third transmission queue corresponding to each raw data; sequencing the plurality of raw data according to the third transmission queue to obtain sequenced data, wherein raw data corresponding to a same third transmission queue are adjacent; sequentially writing the sequenced data into a data buffer of the host.

By applying the embodiments of the present application, it is provided a data processing solution based on a para-virtualization device. A DMA request is initiated by means of an aggregation operation at one time, it is then not necessary to initiate a DMA request for each queue item, thereby achieving the technical effects of reducing the number of operations generated by updating the 'Used Ring', avoiding the occurrence of a back-pressurization of the PCIe interface on the device side, and improving the DMA performance, thereby solving the technical problem in the related technologies of frequent interactions between the para-virtualization device and the host that results in a reduced DMA performance.

Those skilled in the art should understand that the structure shown in FIG. 9 is only illustrative. The computer terminal may also be a terminal device such as smart phone (e.g., Android phones, iOS phones, and so forth), tablet PC, palmtop, and Mobile Internet Devices (MID), and PAD. FIG. 9 does not limit the structure of the electronic apparatus mentioned above. For example, the computer terminal A may further include more or few subassemblies (e.g., network interface and display apparatus, and the like) than that shown in FIG. 9, or have a different configuration from that shown in FIG. 9.

Those skilled in the art should understand that all or some steps in the respective methods of the embodiments above may be implemented by instructing hardware associated with terminal devices through a program. The program may be stored in a computer readable storage medium which includes: a flash disk, a Read-Only Memory (ROM), a Random Access Memory (RAM), a magnetic disk or an optical disk, etc.

EMBODIMENT 5

The embodiment of the present application further provides a storage medium. Optionally, in the embodiment, the storage medium mentioned above may be used to store program codes executed by the data processing method based on the para-virtualization device provided in the above embodiment.

Optionally, in the embodiment, the above storage medium may be located in any computer terminal in a computer terminal cluster located in a computer network, or located in any mobile terminal of a mobile terminal cluster.

Optionally, in the embodiment, the storage medium is arranged to store program codes for executing the following steps: acquiring a plurality of initial data stored in a completion queue of the para-virtualization device, wherein the plurality of initial data is used to characterize descriptive information of raw data which has been processed by the para-virtualization device but not been submitted to a host; determining a plurality of first data that satisfy a preset condition among the plurality of initial data; performing an aggregation operation on the plurality of first data to generate a first aggregation result; sending a direct memory access request carrying the first aggregation result to a memory of the host.

Optionally, the storage medium above is further arranged to store program codes for executing the following steps: acquiring data stored in a target buffer to obtain the plurality of first data, wherein the plurality of initial data are sequentially cached to the target buffer; and/or determining the plurality of initial data as the plurality of first data in a case where a preset time arrives; and/or determining the plurality of initial data as the plurality of first data in a case where the amount of the plurality of initial data is greater than or equal to a preset amount.

Optionally, the storage medium is further provided to store program codes for executing the following steps: determining a first transmission queue corresponding to each first data, wherein the first transmission queue is used to transmit the raw data; acquiring first data corresponding to a same first transmission queue to obtain the first aggregation result.

Optionally, the above storage medium is further arranged to store program codes for executing the following steps: determining a first transmission queue corresponding a first one of the first data among the plurality of first data to obtain a target transmission queue; acquiring first data corresponding to the target transmission queue among the plurality of first data to obtain the first aggregation result.

Optionally, the above storage medium is further arranged to store program codes for executing the following steps: determining a plurality of second data among the plurality of initial data on the basis of an initial queue identification corresponding to the completion queue, wherein the initial queue identification is used to characterize identification information of data that has been submitted, and the plurality of second data are used to characterize data currently submitted to the host; performing an aggregation operation on the plurality of second data to obtain a second aggregation result; updating the initial queue identification on the basis of the second aggregation result.

Optionally, the above storage medium is further arranged to store program codes for executing the following steps: determining a second transmission queue corresponding to each second data; acquiring second data corresponding to a same second transmission queue to obtain the second aggregation result.

Optionally, the above storage medium is further arranged to store program codes for executing the following steps: acquiring a plurality of raw data; determining a third transmission queue corresponding to each raw data; sequencing the plurality of raw data according to the third transmission queue to obtain sequenced data, wherein raw data corresponding to a same third transmission queue are adjacent; sequentially writing the sequenced data into a data buffer of the host.

The serial numbers of the embodiments of the present application mentioned above are only for description, not representing advantages and disadvantages of the embodiments.

In the above embodiments of the present application, there are emphases on description of respective embodiments. For any part not illustrated in a detailed manner in an embodiment, reference may be made to relevant description of other embodiments.

Based on the embodiments provided by the present application, it should be understood that the technical contents disclosed may be implemented in other ways. The apparatus embodiments described are only illustrative. For example, the division of units is only a division of logical functions, and in actual implementations, there may be other division approaches. For example, multiple units or disassembles may be combined or integrated into another system. As an alternative, some features may be ignored, or not executed. From another point, mutual coupling, direct coupling or communicative connection as shown or discussed may be those through some interfaces, units or modules, and may be electrical or in other forms.

The units illustrated as separated components may be or may also not be physically separated, and the components shown as units may be or may also be physical units, that is, they may be located in one place or may also be distributed on multiple network units. Some or all of these units may be selected in light of actual needs to implement the purpose of the solution in the embodiments.

In addition, the respective functional units in respective embodiments of the present application may be integrated in one processing unit, or the respective units may exist separately physically, or two or more units may be integrated in one unit. The integrated unit above may be realized in the form of hardware or in the form of software function unit.

If an integrated unit is realized in the form of software function unit, and is sold or used as an independent product, it may be stored in a computer-readable non-volatile storage medium. Based on this understanding, the essence of the technical solution of the present application, or the part that contributes over the prior art, or all or part of the technical solution may be embodied in the form of a software product. The computer software product is stored in a storage medium, including several instructions to enable a computer device (which may be a personal computer, a server, or a network device, etc.) to perform all or part of the steps of the methods described in various embodiments of the present application. The aforementioned medium includes: various media that may store program codes, such as U disk, Read-Only Memory (ROM), Random Access Memory (RAM), mobile hard disk, magnetic disk or optical disk, etc.

The above are only the preferred embodiments of the present application. It should be pointed out that for those of ordinary skill in the art, some improvements and modifications may also be made without departing from the principle of the present application. These improvements and modifications should also be deemed to fall within the protection scope of the present application.

What is claimed is:

1. A data processing method based on a para-virtualization device, comprising:

acquiring a plurality of initial data stored in a completion queue of the para-virtualization device, wherein the plurality of initial data is used to characterize descriptive information of raw data which has been processed by the para-virtualization device but not been submitted to a host, wherein the descriptive information comprises addresses and lengths associated with the raw data;

determining a plurality of first data that satisfy a preset condition among the plurality of initial data;

performing an aggregation operation on the plurality of first data to generate a first aggregation result, wherein the aggregation operation comprises splicing description information corresponding to the plurality of first data, which comprises at least one of: splicing addresses in the description information corresponding to the plurality of first data, and summing lengths in the description information corresponding to the plurality of first data;

sending a direct memory access request carrying the first aggregation result to a memory of the host.

2. The method according to claim 1, wherein determining the plurality of first data that satisfy the preset condition among the plurality of initial data comprises at least one of the following:

acquiring data stored in a target buffer to obtain the plurality of first data, wherein the plurality of initial data are sequentially cached to the target buffer;

determining the plurality of initial data as the plurality of first data in a case where a preset time arrives;

determining the plurality of initial data as the plurality of first data in a case where the amount of the plurality of initial data is greater than or equal to a preset amount.

3. The method according to claim 1, wherein performing the aggregation operation on the plurality of first data to generate the first aggregation result comprises:

determining a first transmission queue corresponding to each first data, wherein the first transmission queue is used to transmit the raw data;

acquiring first data corresponding to a same first transmission queue to obtain the first aggregation result.

4. The method according to claim 3, wherein acquiring the first data corresponding to the same first transmission queue to obtain the first aggregation result comprises:

determining a first transmission queue corresponding a first one of the first data among the plurality of first data to obtain a target transmission queue;

acquiring first data corresponding to the target transmission queue among the plurality of first data to obtain the first aggregation result.

5. The method according to claim 1, further comprising:

determining a plurality of second data among the plurality of initial data on the basis of an initial queue identification corresponding to the completion queue, wherein the initial queue identification is used to characterize identification information of data that has been submitted, and the plurality of second data are used to characterize data currently submitted to the host;

performing an aggregation operation on the plurality of second data to obtain a second aggregation result;

updating the initial queue identification on the basis of the second aggregation result.

6. The method according to claim 5, wherein performing the aggregation operation on the plurality of second data to obtain the second aggregation result comprises:

determining a second transmission queue corresponding to each second data;

acquiring second data corresponding to a same second transmission queue to obtain the second aggregation result.

7. The method according to claim 1, further comprising:

acquiring a plurality of raw data;

determining a third transmission queue corresponding to each raw data;

sequencing the plurality of raw data according to the third transmission queue to obtain sequenced data, wherein raw data corresponding to a same third transmission queue are adjacent;

sequentially writing the sequenced data into a data buffer of the host.

8. A data processing system based on a para-virtualization device, comprising:

a host, comprising a memory and a completion queue;

the para-virtualization device connected with the host for acquiring a plurality of initial data stored in the completion queue, wherein the plurality of initial data is used to characterize descriptive information of raw data which has been processed by the para-virtualization device but not been submitted to the host, wherein the descriptive information comprises addresses and lengths associated with the raw data; determining a plurality of first data that satisfy a preset condition among the plurality of initial data; performing an aggregation operation on the plurality of first data to generate a first aggregation result, wherein the aggregation operation comprises splicing description information corresponding to the plurality of first data, mation corresponding to the plurality of first data, which comprises at least one of: splicing addresses in the description information corresponding to the plurality of first data, and summing lengths in the description information corresponding to the plurality of first data; sending a direct memory access request carrying the first aggregation result to the memory of the host.

9. A non-transitory computer-readable storage medium comprising a stored program, wherein the program, when running, controls a device in which the computer-readable storage medium is located to execute the data processing method based on the para-virtualization device of claim 1.

10. A non-transitory computer-readable storage medium comprising a stored program, wherein the program, when running, controls a device in which the computer-readable storage medium is located to execute the data processing method based on the para-virtualization device of claim 2.

11. A non-transitory computer-readable storage medium comprising a stored program, wherein the program, when running, controls a device in which the computer-readable storage medium is located to execute the data processing method based on the para-virtualization device of claim 3.

12. A non-transitory computer-readable storage medium comprising a stored program, wherein the program, when running, controls a device in which the computer-readable storage medium is located to execute the data processing method based on the para-virtualization device of claim 4.

13. A non-transitory computer-readable storage medium comprising a stored program, wherein the program, when running, controls a device in which the computer-readable storage medium is located to execute the data processing method based on the para-virtualization device of claim 5.

14. A non-transitory computer-readable storage medium comprising a stored program, wherein the program, when running, controls a device in which the computer-readable storage medium is located to execute the data processing method based on the para-virtualization device of claim 6.

15. A non-transitory computer-readable storage medium comprising a stored program, wherein the program, when running, controls a device in which the computer-readable storage medium is located to execute the data processing method based on the para-virtualization device of claim 7.

16. A computer terminal, comprising: a memory and a processor, the processor being used to run a program stored in the memory, wherein the program, when running, executes the data processing method based on the para-virtualization device of claim 1.

17. A computer terminal, comprising: a memory and a processor, the processor being used to run a program stored in the memory, wherein the program, when running, executes the data processing method based on the para-virtualization device of claim 2.

18. A computer terminal, comprising: a memory and a processor, the processor being used to run a program stored in the memory, wherein the program, when running, executes the data processing method based on the para-virtualization device of claim 3.

19. A computer terminal, comprising: a memory and a processor, the processor being used to run a program stored in the memory, wherein the program, when running, executes the data processing method based on the para-virtualization device of claim 4.

20. A computer terminal, comprising: a memory and a processor, the processor being used to run a program stored in the memory, wherein the program, when running, executes the data processing method based on the para-virtualization device of claim 5.

* * * * *